United States Patent
Kim

(10) Patent No.: US 11,072,708 B2
(45) Date of Patent: Jul. 27, 2021

(54) ASPHALT CONCRETE COMPOSITION HAVING IMPROVED WATERPROOF PERFORMANCE BY COMPRISING SIS, RECYCLED ASPHALT AGGREGATE, AND FINE POWDER AGGREGATE WITH IMPROVED PARTICLE SIZE, AND CONSTRUCTION METHOD USING THE SAME

(71) Applicant: GK INSTITUTE OF TECHNOLOGY CO., LTD, Chuncheon-si (KR)

(72) Inventor: In Joong Kim, Namyangju-si (KR)

(73) Assignee: GK INSTITUTE OF TECHNOLOGY CO., LTD, Chuncheon-si (KR)

( * ) Notice: Subject to any disclaimer, the term of this patent is extended or adjusted under 35 U.S.C. 154(b) by 29 days.

(21) Appl. No.: 16/519,505

(22) Filed: Jul. 23, 2019

(65) Prior Publication Data
US 2020/0040186 A1    Feb. 6, 2020

(30) Foreign Application Priority Data
Jul. 31, 2018    (KR) .................... 10-2018-0089558

(51) Int. Cl.
*C08L 95/00*    (2006.01)
*C08K 7/02*    (2006.01)
(Continued)

(52) U.S. Cl.
CPC .......... *C08L 95/00* (2013.01); *C04B 24/2676* (2013.01); *C08K 7/02* (2013.01);
(Continued)

(58) Field of Classification Search
CPC ........ C08L 95/00; C08L 1/02; C08L 2555/34; C08L 2555/52; C08L 2555/74;
(Continued)

(56) References Cited

FOREIGN PATENT DOCUMENTS

| KR | 101661309 B1 | * | 10/2016 |
| KR | 101712921 B1 | * | 3/2017 |

(Continued)

OTHER PUBLICATIONS

KR101661309 Translation via Dialog (Year: 2016).*
KR101712921 translation via EspaceNet (Year: 2017).*
WO2016182177A1 translation via EspaceNet (Year: 2016).*

*Primary Examiner* — Karl E Group
*Assistant Examiner* — Cameron K Miller
(74) *Attorney, Agent, or Firm* — Im IP Law; Chai Im; C. Andrew Im

(57) ABSTRACT

An asphalt concrete composition having improved waterproof performance, and a construction method using the composition. The composition includes 100 parts by weight of virgin asphalt, 5 to 25 parts by weight of styrene isoprene styrene, 5 to 15 parts by weight of petroleum resin, 250 to 1,000 parts by weight of reclaimed asphalt pavement, 1 to 10 parts by of a performance improving agent, 250 to 1,000 parts by weight of virgin aggregate, 30 to 150 parts by weight of fine powder aggregate, and 0.1 to 2 parts by weight of cellulose fiber. The composition's waterproof performance is due to its high cohesion and adhesion. The composition is durable and is not easily rutted, aged and/or stripped. In addition, the composition has a performance grade of PG 82-34, can prevent water penetration and potholes, and enables a placement process to be easily performed at low costs.

16 Claims, 1 Drawing Sheet

(51) Int. Cl.
*C08L 1/02* (2006.01)
*C04B 24/26* (2006.01)
*C04B 111/00* (2006.01)
*C04B 111/27* (2006.01)

(52) U.S. Cl.
CPC ......... *C08L 1/02* (2013.01); *C04B 2111/0075* (2013.01); *C04B 2111/27* (2013.01); *C08L 2555/34* (2013.01); *C08L 2555/52* (2013.01); *C08L 2555/74* (2013.01); *C08L 2555/84* (2013.01)

(58) Field of Classification Search
CPC ............. C08L 2555/84; C04B 24/2676; C04B 2111/0075; C04B 2111/27; C08K 7/02
See application file for complete search history.

(56) References Cited

FOREIGN PATENT DOCUMENTS

KR       10-1835081 B1    4/2018
WO    WO-2016182177 A1 *  11/2016   ............. C04B 26/16

\* cited by examiner

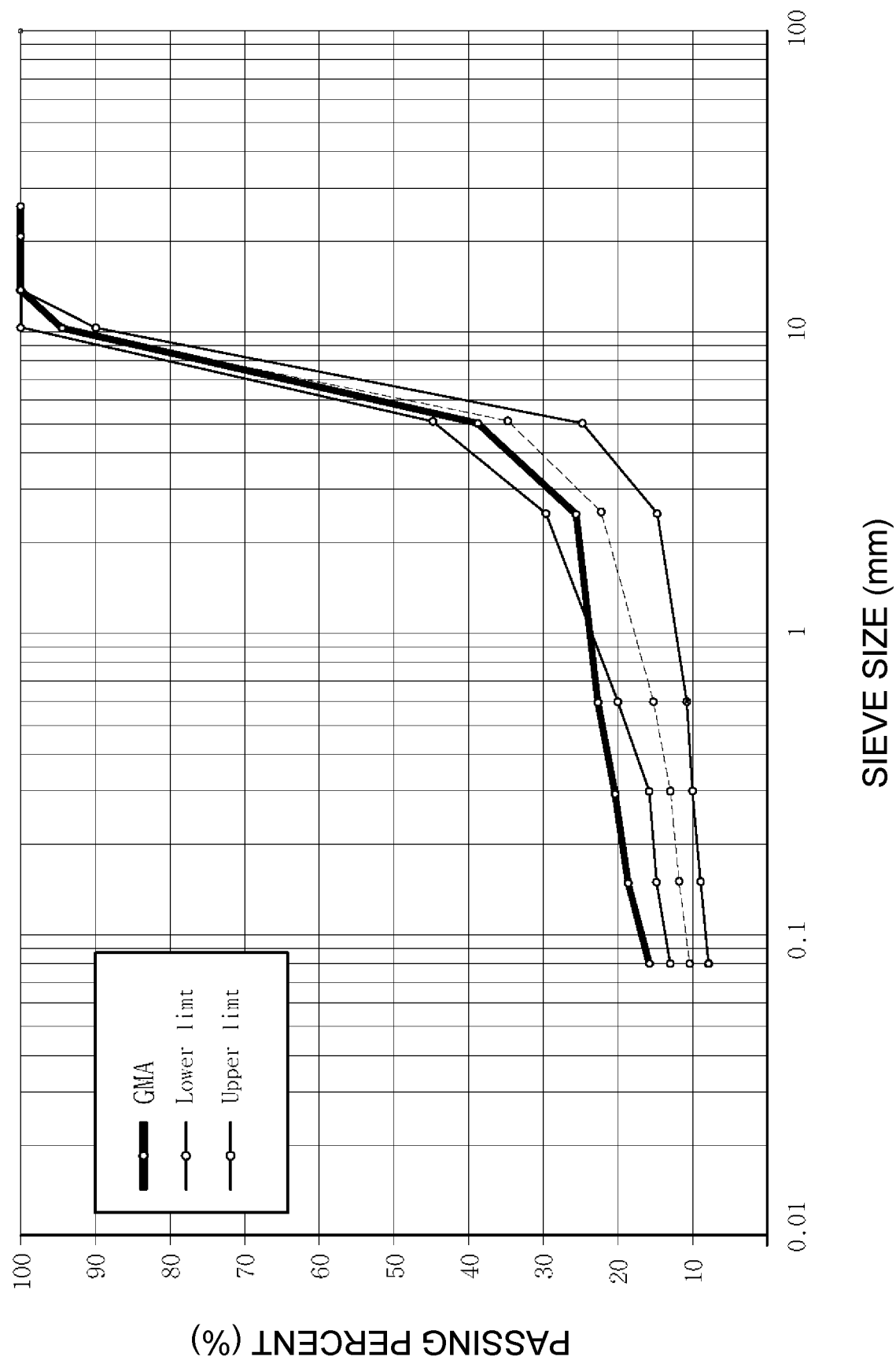

ASPHALT CONCRETE COMPOSITION HAVING IMPROVED WATERPROOF PERFORMANCE BY COMPRISING SIS, RECYCLED ASPHALT AGGREGATE, AND FINE POWDER AGGREGATE WITH IMPROVED PARTICLE SIZE, AND CONSTRUCTION METHOD USING THE SAME

RELATED APPLICATION

This application claims priority from Korean Patent Application No. 10-2018-0089558 filed Jul. 31, 2018, which is incorporated herein by reference in its entirety.

FIELD OF THE INVENTION

The present invention relates to an asphalt concrete composition having improved waterproof performance by comprising styrene isoprene styrene (SIS), recycled asphalt aggregate, and fine powder aggregate with improved particle size, and a construction method using the same, and more particularly to an asphalt concrete composition having improved waterproof performance by comprising SIS, recycled asphalt, and fine powder aggregate with improved particle size, which improve the physical properties of asphalt concrete, and a construction method using the same.

BACKGROUND OF THE INVENTION

Generally, asphalt is a black or dark brown solid or semi-solid thermoplastic material that has a complex structure composed of thousands of different types of macromolecular hydrocarbon (CH) and contains organic compounds and trace amounts of inorganic compounds. It has the property of gradually changing into liquid phase upon heating.

The asphalt is divided into several types, such as natural asphalt, petroleum-based asphalt, and road tar, and straight asphalt and emulsified asphalt are widely known.

Furthermore, the asphalt has excellent stickiness and excellent adhesion to mineral materials, and thus is used as a bonding material or an adhesive material. Moreover, it is not soluble in water and impermeable, it is also used as a waterproof material. In addition, it is used in a wide range of applications since the viscosity thereof can be changed according to the intended use. In addition, it is used in various applications, including road pavement, waterproofing, general industrial applications, and agricultural applications.

As asphalt for road pavement, straight asphalt which is petroleum-based asphalt having excellent adhesion, extensibility and water absorption/permeation ability is generally used.

However, since straight asphalt has disadvantages of low softening point, high temperature sensitivity, weak weather resistance and weak cohesive strength, various modifiers are added to the straight asphalt in order to overcome these disadvantages and to meet the characteristics of the place where it is used.

In general, examples of asphalt modifiers include rubber-based modifiers, thermoplastic resin-based modifiers, thermosetting resin-based modifiers, filler-based modifiers, fiber-based modifiers, antioxidants, reducing agents, and the like. The rubber-based modifiers include styrene butadiene rubber (SBR), crumb rubber, and the like; the thermoplastic resin-based modifiers include styrene butadiene styrene (SBS), ethylene vinyl acetate (EVA), polyethylene (PE), polypropylene (PP), polyvinyl chloride (PVC), polyethylene terephthalate (PET), and the like; the thermosetting resin-based modifiers include epoxy resin, urethane resin, acrylic resin, phenol resin, petroleum resin, and the like; and the hydrocarbon-based modifiers include natural asphalt, gilsonite, and the like.

However, the asphalt modifiers developed so far have problems associated with the cracking and rutting (plastic deformation) of pavement, which appear because the resistances of the asphalt to low-temperature cracking and fatigue cracking are decreased by a significant temperature difference between the four seasons with the passage of time after construction. In addition, these asphalt modifiers show problems, such as asphalt oxidation caused by exposure to air and sunlight, and aggregate loss caused by reduction in adhesion. In addition, in the case of plant-mix type modifiers, it is not easy to ensure uniform quality, and in the case of pre-mix type modified asphalt, it is not easy to mix components uniformly, and components such as a modifier and asphalt depend on physical bonding, and thus the storage stability of the asphalt is low, indicating that it is difficult to store the asphalt.

Especially, since the year 2000, modified concrete having improved concrete performance by comprising rapidly hardening cement and polymers have been developed and widely used as a repair material for concrete road structures due to its short hardening time and high water permeability resistance and freezing-thawing resistance.

However, the modified concrete has a problem in that it is costly because of containing a large amount of latex. It also has a problem in that it has low heat reflection rate, and thus its preventive effect against early freezing in the winter season is insufficient compared to that of conventional asphalt concrete. In addition, it has a problem in that the heat absorption rate is low, and thus, cracking, surface stripping, and potholes occur due to temperature stress in an environment where there is a severe change in the outside temperature (daily temperature range, four seasons) as in Korea.

Furthermore, in some bridges or special areas, there are places where even polymer-modified asphalt (PMA) pavement hardly withstands severe traffic jam and heavy traffic conditions.

Therefore, it is necessary to construct very strong asphalt pavement with a thick thickness. However, general asphalt pavement should not only be thick but also have strong elasticity, toughness and tensile strength.

Generally, for steel box-girder bridges as well as concrete bridges, a waterproofing process is performed to prevent deterioration of the underlying layer.

However, the waterproof layer (coating film, coating, etc.) has a problem in that it is costly without having structural performance.

Therefore, when a mixture having excellent elasticity as mentioned above and a mixture having high adhesion while having high toughness and tensile strength are applied, asphalt pavement exhibiting both structural performance and durability can be obtained, and thus asphalt pavement having excellent durability while being capable of withstanding heavy traffic loads can be obtained, which is easily constructed and enables rapid traffic opening.

Meanwhile, as a conventional art related to the above-described technology, Korean Patent Application No. 10-2017-0130362 discloses a low-temperature hardening high grade asphalt concrete composition having excellent cracking reduction effect and improved waterproof performance, and a construction method using the same.

SUMMARY OF THE INVENTION

The present invention has been made in order to overcome the above-described problems and is intended to provide an asphalt concrete composition with improved waterproof performance, which has good waterproof performance and durability, is not easily rutted, aged and/or striped, and is also capable of preventing water penetration and potholes.

The present invention provides an asphalt concrete composition comprising: 100 parts by weight of virgin asphalt; 5 to 25 parts by weight of styrene isoprene styrene; 5 to 15 parts by weight of petroleum resin; 250 to 1,000 parts by weight of recycled asphalt aggregate; 1 to 10 parts by of a performance improving agent; 250 to 1,000 parts by weight of virgin aggregate; 30 to 150 parts by weight of fine powder aggregate; and 0.1 to 2 parts by weight of cellulose fiber.

The present invention also provides a method for constructing asphalt concrete pavement, comprising: cleaning a target surface to be paved; providing an asphalt concrete composition comprising 100 parts by weight of virgin asphalt, 5 to 25 parts by weight of styrene isoprene styrene, 5 to 15 parts by weight of petroleum resin, 250 to 1,000 parts by weight of recycled asphalt aggregate, 1 to 10 parts by of a performance improving agent, 250 to 1,000 parts by weight of virgin aggregate, 30 to 150 parts by weight of fine powder aggregate, and 0.1 to 2 parts by weight of cellulose fiber; transporting the provided asphalt concrete composition by a transporting means and placing the transported asphalt concrete composition on the cleaned target surface; compacting the placed asphalt concrete composition; and curing the compacted asphalt concrete composition.

BRIEF DESCRIPTION OF THE DRAWINGS

FIG. 1 is a graph showing the particle size of the aggregate of an asphalt concrete composition having improved waterproof performance.

DETAILED DESCRIPTION OF THE INVENTION

Hereinafter, the present invention will be described in detail.

In one aspect, the present invention provides an asphalt concrete composition comprising: 100 parts by weight of virgin asphalt; 5 to 25 parts by weight of styrene isoprene styrene; 5 to 15 parts by weight of petroleum resin; 250 to 1,000 parts by weight of recycled asphalt aggregate; 1 to 10 parts by of a performance improving agent; 250 to 1,000 parts by weight of virgin aggregate; 30 to 150 parts by weight of fine powder aggregate; and 0.1 to 2 parts by weight of cellulose fiber.

In another aspect, the present invention provides a method for constructing asphalt concrete pavement, comprising: cleaning a target surface to be paved; providing an asphalt concrete composition comprising 100 parts by weight of virgin asphalt, 5 to 25 parts by weight of styrene isoprene styrene, 5 to 15 parts by weight of petroleum resin, 250 to 1,000 parts by weight of recycled asphalt aggregate, 1 to 10 parts by of a performance improving agent, 250 to 1,000 parts by weight of virgin aggregate, 30 to 150 parts by weight of fine powder aggregate, and 0.1 to 2 parts by weight of cellulose fiber; transporting the provided asphalt concrete composition by a transporting means and placing the transported asphalt concrete composition on the cleaned target surface; compacting the placed asphalt concrete composition; and curing the compacted asphalt concrete composition.

The virgin asphalt that is used in the present invention is not particularly limited as long as it is asphalt that is conventionally used in the art. However, it may preferably be petroleum-based asphalt or an asphalt mixture.

The asphalt mixture is not particularly limited as long as it is an asphalt mixture that is conventionally used in the art. However, the asphalt mixture is preferably a mixture of straight asphalt and at least one selected from among Trinidad lake asphalt, Trinidad epure asphalt and a mixture thereof. More preferably, the asphalt mixture is a mixture of straight asphalt having a penetration index of 20 to 40 and Trinidad lake asphalt and/or Trinidad epure asphalt. Even more preferably, the asphalt mixture is a mixture of 70 to 80 wt % of straight asphalt having a penetration index of 20 to 40 and 20 to 30 wt % of Trinidad lake asphalt or Trinidad epure asphalt.

As used herein, the term "straight asphalt" refers to conventional petroleum asphalt obtained by refining a fraction that remains after drying or distillation of crude petroleum. Straight asphalt that is used in the present invention preferably has a penetration index of 20 to 40 in view of the easiness of pavement of roads.

The straight asphalt is preferably contained in the asphalt mixture in an amount of 70 to 80 wt %. If the content of the straight asphalt in the asphalt mixture is less than 70 wt %, a long period of time can be required for curing of the asphalt pavement, and the softening point of the asphalt mixture can be reduced. If the content of the straight asphalt in the asphalt mixture is more than 80 wt %, the fluidity of the asphalt mixture can be reduced.

In addition, the asphalt that is used in the present invention serves to improve the fluidity of the asphalt concrete composition of the present invention, which has improved waterproof performance by comprising SIS, recycled asphalt aggregate, and fine powder aggregate with improved particle size, and also to increase the rutting resistance, skid resistance and frictional resistance of the asphalt concrete composition.

The asphalt that is used in the present invention may be Trinidad lake asphalt and/or Trinidad epure asphalt.

The asphalt is preferably contained in the asphalt mixture in an amount of 20 to 30 wt %. If the content of the asphalt in the asphalt mixture is less than 20 wt %, the effect of improving the fluidity, rutting resistance, skid resistance and frictional resistance of the asphalt concrete composition will be insignificant, and if the content of the asphalt is more than 30 wt %, the asphalt concrete composition of the present invention can be softened, and the softening point thereof can be reduced.

The contents of components other than virgin asphalt in the asphalt concrete composition according to the present invention, which has improved waterproof performance by comprising SIS, recycled asphalt aggregate, and fine powder aggregate with improved particle size, are based on 100 parts by weight of the virgin asphalt.

Styrene isoprene styrene (SIS) that is used in the present invention serves to suppress cracking of the asphalt concrete composition having improved waterproof performance by comprising SIS, recycled asphalt aggregate, and also to prevent potholes, impart tenacity to the composition and improve the strength of the composition.

Although the preferred amount of styrene isoprene styrene (SIS) used may vary according to the user's choice, it is preferably 5 to 25 parts by weight based on 100 parts by weight of the virgin asphalt.

The petroleum resin that is used in the present invention serves to provide adhesive and waterproof properties, and may be any convention petroleum resin which is generally used in the art for this purpose. However, it is preferably a petroleum resin having a melting temperature of 100° C. or higher, a penetration index of 3 dmm or less, and a viscosity at 140° C. of 50 to 500 cps, more preferably an aliphatic C5 petroleum resin having a melting temperature of 110° C. to 140° C., a penetration index of 0.5 to 2 dmm, and a viscosity at 140° C. of 50 to 300 cps, but is not necessarily limited thereto.

If the melting temperature of the petroleum resin is 100° C. or lower, the petroleum resin will be sticky at high temperature or may form lumps, which may result in defective products, and if the penetration index of the petroleum resin is 0.5 dmm or less, the petroleum resin will be excessively runny, making it difficult to improve the high-temperature physical properties of the asphalt.

In addition, if the viscosity at 140° C. of the petroleum resin is 500 cps or higher, it is higher than the viscosity of asphalt, and thus the manufacturing time becomes excessively long.

Although the preferred amount of petroleum resin used is not particularly limited, it is 5 to 15 parts by weight based on 100 parts by weight of the virgin asphalt.

The recycled asphalt aggregate that is used in the present invention is aggregate obtained by recycling waste asphalt or a waste by-product of concrete roads, for example, waste of asphalt used for conventional road pavement. The recycled asphalt aggregate that is used in the present invention may be any asphalt which is generally used in the art for this purpose, but it is preferably one recycled by crushing waste asphalt.

At this time, for the use of the recycled asphalt aggregate, the waste asphalt contained in the recycled asphalt aggregate is preferably subjected to first crushing using a jaw crusher, washed to remove foreign matter, subjected to second crushing using a double jaw crusher, subjected to third crushing using a cone crusher, and then sorted according to size. Here, it is preferably sorted to a size of 10 to 25 mm or 0.08 to 10 mm, but is not necessarily limited thereto. The recycled asphalt aggregate is preferably used in an amount of 250 to 1000 parts by weight based on 100 parts by weight of the virgin asphalt.

The performance improving agent that is used in the present invention functions not only to restore the physical properties of the asphalt by supplementing deficient components in the reclaimed asphalt but also to improve the physical properties of the asphalt by the vulcanization activity of the sulfur component contained in heavy oil. It may be any performance improving agent known in the art, which has this purpose. It is used in an amount of 1 to 10 parts by weight based on 100 parts by weight of the virgin asphalt.

The performance improving agent preferably comprises 90 to 99.5 wt % of vinyl acetate monomer-paraffin oil and 0.5 to 10 parts by weight of benzoyl peroxide.

Here, the vinyl acetate monomer-paraffin oil is preferably a mixture of 5 to 25 wt % of a vinyl acetate monomer and 75 to 95 wt % of paraffin oil.

The virgin aggregate that is used in the present invention is a mineral material for construction that can be consolidated into a lump by the asphalt, the petroleum resin and/or a binder such as styrene isoprene styrene, and is chemically stable.

The term "virgin aggregate" refers to sand, gravel, basalt, obsidian, or other similar material.

Specifically, the virgin aggregate may further comprise basic dyke rock having a water absorption rate of about 0.7% and/or bauxite having a water absorption rate of about 5.40%.

Here, the virgin aggregate preferably has a particle size of 0.08 to 13 mm.

The preferred amount of virgin aggregate used is 250 to 1,000 parts by weight based on 100 parts by weight of the virgin asphalt. Preferably, the virgin aggregate comprises, based on 100 parts by weight of the virgin asphalt, 2.5 to 100 parts by weight of virgin aggregate having a particle size of 0.08 to 2.49 mm, 25 to 100 parts by weight of virgin aggregate having a particle size of 2.5 to 5.99 mm, 22.5 to 200 parts by weight of virgin aggregate having a particle size of 6 to 9.99 mm, 100 to 300 parts by weight of virgin aggregate having a particle size of 10 to 12.99 mm, and 100 to 300 parts by weight of virgin aggregate having a particle size of 13 mm, in order to maximize the waterproof performance of the composition by filling the voids between the aggregates.

The fine powder aggregate that is used in the present invention serves to improve the waterproof performance by filling the voids between the virgin aggregate and the recycled asphalt aggregate, and is also referred to as a filler. It may be any conventional fine powder aggregate which is generally known in the art for this purpose.

The fine powder aggregate preferably has a particle size of at least less than 0.08 mm, more preferably 0.001 to 0.0799 mm, and is preferably used in an amount of 30 to 150 parts by weight based on 100 parts by weight of the virgin asphalt.

In a conventional art, fine powder aggregate that is used for waterproof asphalt is not particularly limited in its size and is used in combination with aggregate in an amount of 30 parts by weight or less based on 100 parts by weight of virgin asphalt. However, the present invention is intended to maximize the waterproof performance by improving and limiting the particle size of fine powder aggregate. As shown in a particle size graph in FIG. 1, it can be seen that the sieve passing percentage of the fine powder aggregate of the asphalt concrete composition having improved waterproof performance exceeds the upper limit and lower limit of conventional particle size, indicating that the fine powder aggregate is suitable for waterproofing asphalt.

In addition, the term "fine powder aggregate" refers to fine stone powder, fine limestone powder, fine sand powder, fine gravel powder, fine basalt powder, fine obsidian powder, or other similar material.

The cellulose fiber that is used in the present invention serves to provide tensile force by stress, applied in the longitudinal and transverse directions of a bridge deck formed of the asphalt concrete composition, and/or lightweight properties. The cellulose fiber may be any cellulose fiber which is used for this purpose, but it is preferably natural cellulose fiber. The cellulose fiber is preferably used in an amount of 0.1 to 2 parts by weight based on 100 parts by weight of the virgin asphalt.

In specific embodiments, the asphalt concrete composition having improved waterproof performance according to the present invention may further comprise one or more additives as described below.

In a specific embodiment, the asphalt concrete composition having improved waterproof performance according to the present invention, specifically the asphalt concrete composition having improved waterproof performance by comprising SIS, recycled asphalt aggregate, and fine powder aggregate with improved particle size, may further comprise a silane compound in an amount of 3 to 15 parts by weight of the virgin asphalt, in order to improve the adhesion and durability of the composition.

Preferred examples of the silane compound that may be used in the present invention include perfluoroalkoxysilanes, such as perfluoromethoxysilane and perfluoroethoxysilane; tetraalkoxysilanes, such as tetramethoxysilane and tetraethoxysilane; siloxane oligomers, such as trialkoxysilane, tetraalkoxysilane, and dialkoxysilane; and mixtures of two or more thereof.

In another specific embodiment, the asphalt concrete composition having improved waterproof performance according to the present invention may further comprise an anti-flow agent in an amount of 1 to 10 parts by weight based on 100 parts by weight of the virgin asphalt, in order to prevent the composition having improved waterproof performance from having more flow than necessary during construction using the asphalt concrete composition.

The anti-flow agent may preferably be at least one selected from zinc stearate, calcium stearate, stearic acid, and mixtures thereof.

In still another specific embodiment, the asphalt concrete composition having improved waterproof performance according to the present invention may further comprise an anti-rutting agent in an amount of 2 to 15 parts by weight based on 100 parts by weight of the virgin asphalt, in order to reduce rutting of the composition.

The anti-rutting agent that is used in the present invention preferably comprises polyethylene, ethylene vinyl acetate, polybutene, high-impact polystyrene, polypropylene, or a mixture of two or more thereof.

If the anti-rutting agent is used in an amount of less than 2 parts by weight, the effect of preventing rutting will be insignificant, and if the anti-rutting agent is used in an amount of more than 15 parts by weight, it will not be easily mixed with other components of the asphalt concrete composition.

In another specific embodiment, the asphalt concrete composition having improved waterproof performance according to the present invention may further comprise a viscosity index improver in an amount of 3 to 20 parts by weight based on 100 parts by weight of the virgin asphalt, in order to reduce the change in viscosity at high or low temperatures.

The viscosity index improver that is used in the present invention is preferably poly-iso-butylene, an olefin copolymer, an ethylene-propylene copolymer, a styrene-butadiene copolymer, a styrene-maleic acid-ester copolymer, and/or polymethacrylate.

In another specific embodiment, the asphalt concrete composition having improved waterproof performance according to the present invention may further comprise lithium silicate ($Li_2O$—$nSiO_2$—$xH_2O$) in an amount of 3 to 10 parts by weight based on 100 parts by weight of the virgin asphalt, in order to restore the alkalinity of a neutralized concrete structure, thereby suppressing and preventing rebar corrosion from occurs due to concrete neutralization, and to prevent the concrete structure from being deteriorated while being converted into calcium carbonate and water by contact with atmospheric carbonic acid gas. If the content of the lithium silicate in the composition is less than 3 parts by weight, the effect of alkalizing the concrete structure will be reduced, and if the content is more than 8 parts by weight, the alkalizing effect will be somewhat improved, but the effect will not be large, and only the production cost of the product will be increased.

The lithium silicate serves to replace $CO_3$ by ionic bonding with monovalent lithium present in the lithium silicate, and to increase the pH of a neutralized concrete structure to 11 to 12, thereby strongly alkalizing the concrete structure, and also to ionically crosslink with free cement components in the concrete structure, thereby increasing the mechanical strength of the surface and inside of the concrete structure.

In another specific embodiment, the asphalt concrete composition having improved waterproof performance according to the present invention may further comprise sodium alginate in an amount of 5 to 10 parts by weight based on 100 parts by weight of the virgin asphalt, in order to increase the viscosity of the composition and to enhance the adhesion of the composition. If the content of the sodium alginate in the composition is less than 5 parts by weight, the hydrophobicity of the composition will be reduced, and if the content is more than 10 parts by weight, the viscosity of the composition will be excessively increased.

The sodium alginate is a polysaccharide represent by $(C_6H_8O_6)n$. It has a carboxyl group and can be prepared by treating kelp with soda ash. The sodium alginate is viscous by itself, and thus when it is incorporated into the asphalt concrete composition, it will increase the viscosity of the composition and enhance the adhesion of the composition.

In still another specific embodiment, the asphalt concrete composition having improved waterproof performance according to the present invention may further comprise acrylonitrile in an amount of 1 to 10 parts by weight based on 100 parts by weight of the virgin asphalt. If the acrylonitrile is used in an amount of less than 1 part by weight, the effect of improving the durability and alkaline resistance of the composition will be insignificant, and if the acrylonitrile is used in an amount of more than 10 parts by weight, it will excessively increase the viscosity of the composition, resulting in a reduction in the workability of the composition.

In still another specific embodiment, the asphalt concrete composition having improved waterproof performance according to the present invention may further comprise dimethyl ammonium chloride in an amount of 5 to 15 parts by weight based on 100 parts by weight of the virgin asphalt, in order to prevent toxic components present in the asphalt concrete from being dissolved out.

In still another specific embodiment, the asphalt concrete composition having improved waterproof performance according to the present invention may further comprise butyl glycidyl ether in an amount of 1 to 5 parts by weight based on 100 parts by weight of the virgin asphalt, in order to control the viscosity of the composition and to enhance the adhesion of the composition. If the butyl glycidyl ether is used in an amount of less than 1 part by weight, the effect of controlling the viscosity and enhancing the adhesion will be insignificant, and if the butyl glycidyl ether is used in an amount of more than 5 parts by weight, problems will arise in that curing of the composition is retarded and the surface hardness is reduced.

In still another specific embodiment, the asphalt concrete composition having improved waterproof performance according to the present invention may further comprise a boric acid compound in an amount of 1 to 5 parts by weight based on 100 parts by weight of the virgin asphalt, in order to improve the water resistance and scratch resistance of the composition. Examples of the boric acid compound include orthoboric acid, metaboric acid, tetraborate, methyl borate, ethyl borate, and the like. Preferably, orthoboric acid is used.

In still another specific embodiment, the asphalt concrete composition having improved waterproof performance according to the present invention may further comprise zinc oxide in an amount of 1 to 5 parts by weight based on 100 parts by weight of the virgin asphalt, in order to promote curing of the composition and to prevent corrosion of the composition. If the zinc oxide is used in an amount of less than 1 part by weight, the effect of preventing corrosion of the composition will be reduced, and if the zinc oxide is used in an amount of more than 5 parts by weight, problems will arise in that it reduces the adhesion of the composition due to a rapid reaction and causes cracking.

In still another specific embodiment, the asphalt concrete composition having improved waterproof performance according to the present invention may further comprise trimethylolpropane triacrylate in an amount of 1 to 5 parts by weight based on 100 parts by weight of the virgin asphalt, in order to increase the hardness of the composition and to reduce surface contamination of the composition.

In still another specific embodiment, the asphalt concrete composition having improved waterproof performance according to the present invention may further comprise hydrazine phenyl triazine in an amount of 1 to 5 parts by weight based on 100 parts by weight of the virgin asphalt, in order to absorb UV rays and prevent cracking.

In still another specific embodiment, the asphalt concrete composition having improved waterproof performance according to the present invention may further comprise starch phosphate ester, an anionically modified starch, in order to improve the water absorption, permeation and retention properties of the composition. The starch phosphate ester is preferably used in an amount of 0.1 to 2 parts by weight based on 100 parts by weight of the virgin asphalt.

In still another specific embodiment, the asphalt concrete composition having improved waterproof performance according to the present invention may further comprise sodium benzoate in an amount of 0.1 to 1 part by weight based on 100 parts by weight of the virgin asphalt, in order to increase the viscoelasticity of the composition. If the sodium benzoate is used in an amount of less than 0.1 parts by weight based on 100 parts by weight of the virgin asphalt, its effect will be insignificant, and if the sodium benzoate is used in an amount of more than 1 part by weight, it can reduce the physical properties of the composition.

In still another specific embodiment, the asphalt concrete composition having improved waterproof performance according to the present invention may further comprise calcium phosphate in an amount of 1 to 5 parts by weight based on 100 parts by weight of the virgin asphalt, in order to accelerate dissolution of the composition and increase initial reaction heat, thereby accelerating hardening and ensuring initial strength. If the calcium phosphate is used in an amount of more than 5 parts by weight based on 100 parts by weight of the virgin asphalt, it can cause cracking due shrinkage caused by rapid hardening, and if the calcium phosphate is used in an amount of less than 1 part by weight, the hydrolysis rate of the composition will be reduced, resulting in a reduction in the strength of the composition.

In still another specific embodiment, the asphalt concrete composition having improved waterproof performance according to the present invention may further comprise carboxymethylcellulose (CMC), in order to increase the viscosity and adhesion of the composition. The carboxymethylcellulose (CMC) is preferably used in an amount of 1 to 5 parts by weight based on 100 parts by weight of the virgin asphalt.

In still another specific embodiment, the asphalt concrete composition having improved waterproof performance according to the present invention may further comprise tetraethylenepentamine (TEPA) in an amount of 2 to 8 parts by weight based on 100 parts by weight of the virgin asphalt. The tetraethylenepentamine (TEPA), a kind of polyamine, serves to control the curing rate and viscosity of the asphalt concrete composition having improved waterproof performance. If it is used in an amount of less than 2 parts by weight, its effect will be insignificant, and if it is used in an amount of more than 8 parts by weight, it will not be cost-effective.

In still another specific embodiment, the asphalt concrete composition having improved waterproof performance according to the present invention may further comprise octylphenol ethoxylate in an amount of 1 to 5 parts by weight based on 100 parts by weight of the virgin asphalt, in order to ensure rapid curing and improved durability of the composition.

In still another specific embodiment, the asphalt concrete composition having improved waterproof performance according to the present invention may further comprise ammonium nonylphenol ether sulfate in an amount of 1 to 5 parts by weight based on 100 parts by weight of the virgin asphalt, in order to improve the filling and durability properties of the asphalt concrete composition.

In still another specific embodiment, the asphalt concrete composition having improved waterproof performance according to the present invention may further comprise sodium bicarbonate in an amount of 1 to 5 parts by weight based on 100 parts by weight of the virgin asphalt, in order to improve reaction stability by suppressing a rapid reaction upon application of the asphalt concrete composition.

In still another specific embodiment, the asphalt concrete composition having improved waterproof performance according to the present invention may further comprise polyvinylidene fluoride resin in an amount of 1 to 5 parts by weight based on 100 parts by weight of the virgin asphalt, in order to improve the cohesion of the asphalt concrete composition and prevent component separation in the composition.

In still another specific embodiment, the asphalt concrete composition having improved waterproof performance according to the present invention may further comprise amino-functional siloxane, in order to ensure effective curing at room temperature and to provide improved properties such as heat resistance, low-temperature performance, chemical resistance, solvent resistance and oil resistance.

The amino-functional siloxane is not particularly limited, and may be, for example, aminomethyl polydimethylsiloxane. It is preferably used in an amount of 3 to 10 parts by weight based on 100 parts by weight of the virgin asphalt.

In still another specific embodiment, the asphalt concrete composition having improved waterproof performance according to the present invention may further comprise zinc sulphate in an amount of 1 to 3 parts by weight based on 100 parts by weight of the virgin asphalt.

Zinc sulphate has been widely used as an alkalizing agent, and when zinc sulphate is included in the asphalt concrete composition having improved waterproof performance, it can restore the alkalinity of a road to which the composition is applied, and can prevent corrosion by forming an inactive layer on the surface.

In still another specific embodiment, the asphalt concrete composition having improved waterproof performance according to the present invention may further comprise polyindolocarbazole in an amount of 1 to 3 parts by weight based on 100 parts by weight of the virgin asphalt, in order to ensure gelling of the asphalt concrete composition.

In still another specific embodiment, the asphalt concrete composition having improved waterproof performance according to the present invention may further comprise microscopic hollow spherical powder in an amount of 3 to 15 parts by weight based on 100 parts by weight of the virgin asphalt, in order to improve the acid resistance, alkali resistance, weather resistance, flame retardancy, antibacterial activity, sound absorption, abrasion resistance and impact resistance of the composition.

The microscopic hollow spherical powder is powder based on aluminum silicate and having a size of 30 to 100 µm.

In still another specific embodiment, the asphalt concrete composition having improved waterproof performance according to the present invention may further comprise acrylic polymer resin in an amount of 5 to 20 parts by weight based on 100 parts by weight of the virgin asphalt, in order to improve the chemical resistance of the composition.

In still another specific embodiment, the asphalt concrete composition having improved waterproof performance according to the present invention may further comprise calcined pozzolana in an amount of 1 to 5 parts by weight based on 100 parts by weight of the virgin asphalt, in order to further improve the waterproof performance of the composition. The calcined pozzolana is prepared by adding calcium to natural pozzolana composed mainly of fine red volcanic soil. In particular, the calcined pozzolana that is used in the present invention is preferably one prepared by calcining a mixture of 100 parts by weight of natural pozzolana and 1 to 20 parts by weight of calcium at a temperature of 1000 to 1200° C. for 0.5 to 1 hour and grinding the calcined mixture to an average particle size of 10 to 20 µm.

In still another specific embodiment, the asphalt concrete composition having improved waterproof performance according to the present invention may further comprise polymethylsilsesquioxane in an amount of 1 to 5 parts by weight based on 100 parts by weight of the virgin asphalt, in order to improve the adhesion of the composition and fill the voids of a target surface to be paved to which the asphalt concrete composition is applied.

In still another specific embodiment, the asphalt concrete composition having improved waterproof performance according to the present invention may further comprise tetraethylorthosilicate (TEOS) in an amount of 1 to 5 parts by weight based on 100 parts by weight of the virgin asphalt, in order to improve the water penetration resistance of the asphalt concrete composition, thereby minimizing the penetration of rain water or the like into a target surface to be paved to which the asphalt concrete composition is applied.

In still another specific embodiment, the asphalt concrete composition having improved waterproof performance according to the present invention may further comprise polyvinyl pyrrolidone in an amount of 5 to 20 parts by weight based on 100 parts by weight of the virgin asphalt, in order to ensure stable dispersion of the asphalt concrete composition and enable a waterproof layer to be stably maintained by water absorption and swelling.

In still another specific embodiment, the asphalt concrete composition having improved waterproof performance according to the present invention may further comprise dioctyl terephthalate (DOTP) in an amount of 1 to 5 parts by weight based on 100 parts by weight of the virgin asphalt, in order to improve the thermal stability and plasticization efficiency of the asphalt concrete composition.

In still another specific embodiment, the asphalt concrete composition having improved waterproof performance according to the present invention may further comprise sodium rosinate in an amount of 1 to 3 parts by weight based on 100 parts by weight of the virgin asphalt, in order to improve the dispersibility of the asphalt concrete composition and to prevent sticking from occurring after preparation of the composition.

In still another specific embodiment, the asphalt concrete composition having improved waterproof performance according to the present invention may further comprise a 1:1 mixture (w/w) of nickel powder and chromium powder in an amount of 3 to 10 parts by weight based on 100 parts by weight of the virgin asphalt, in order to impart antibacterial and anti-rust effects. The nickel powder and the chromium powder all have a particle size of 200 mesh or less, and the reason why the nickel powder and the chromium powder are used at a weight ratio of 1:1 is to prevent the homogeneity of the asphalt concrete composition from decreasing when the composition is in a slurry state. In addition, the reason why the 1:1 mixture of the nickel powder having a relatively high specific gravity and the chromium powder having a relatively low specific gravity is used is to impart antibacterial and anti-rust effects while preventing the homogeneity of the asphalt concrete composition from decreasing when the composition is in a slurry state. If the mixture of nickel powder and chromium powder is used in an amount of less than 3 parts by weight based on 100 parts by weight of the virgin asphalt, the effect of imparting the antibacterial and anti-rust effects will be insignificant, and if the mixture of nickel powder and chromium powder is used in an amount of more than 10 parts by weight, the uniform dispersibility of the components in a slurry-state mixture will be decreased.

Hereinafter, description will be made of a construction method which is performed using the asphalt concrete composition of the present invention, which is configured as described above and has improved waterproof performance by comprising SIS, recycled asphalt aggregate and fine powder aggregate with improved particle size.

Here, the construction method described below is one embodiment of the asphalt concrete composition having improved waterproof performance by comprising SIS, recycled asphalt aggregate, and fine powder aggregate with improved particle size, and is not limited thereto. The construction method may be any conventional construction method known in the art, which is performed using the asphalt concrete composition having improved waterproof performance, specifically the asphalt concrete composition having improved waterproof performance by comprising SIS, recycled asphalt aggregate, and fine powder aggregate with improved particle size.

In one embodiment, the construction method using the asphalt concrete composition having improved waterproof performance by comprising SIS, recycled asphalt aggregate, and fine powder aggregate with improved particle size according to the present invention, comprises: cleaning a target surface to be paved; providing an asphalt concrete composition comprising 100 parts by weight of virgin asphalt, 5 to 25 parts by weight of styrene isoprene styrene, 5 to 15 parts by weight of petroleum resin, 250 to 1,000 parts by weight of recycled asphalt aggregate, 1 to 10 parts by of a performance improving agent, 250 to 1,000 parts by weight of virgin aggregate, 30 to 150 parts by weight of fine powder aggregate, and 0.1 to 2 parts by weight of cellulose fiber; transporting the provided asphalt concrete composition by a transporting means and placing the transported asphalt concrete composition on the cleaned target surface; compacting the placed asphalt concrete composition; and curing the compacted asphalt concrete composition.

Here, the transporting means in the transporting step is preferably a dump truck.

Hereinafter, the present invention will be described in detail with reference to examples. It is to be understood, however, that these examples are for illustrative purposes only and are not intended to limit the scope of the present invention.

EXAMPLE 1

An asphalt concrete composition having improved waterproof performance was prepared by mixing 100 g of straight asphalt (virgin asphalt) having a penetration index of 30, 15 g of styrene isoprene styrene, 10 g of aliphatic C5 petroleum resin having a viscosity at 140° C. of 130 cps, 600 g of recycled asphalt aggregate comprising waste asphalt having a size of 15 to 20 mm, 5 g of a performance improving agent comprising 95 wt % of vinylacetate monomer-paraffin oil and 5 wt % of benzyl peroxide, 600 g of virgin aggregate comprising a 5:5 mixture (w/w) of gravel having a particle size of about 3 mm and gravel having a particle size of about 5 mm, 80 g of fine powder aggregate comprising limestone having a particle size of about 0.03 mm, and 1 g of natural cellulose fiber.

EXAMPLE 2

An asphalt concrete composition having improved waterproof performance was prepared in the same manner as described in Example 1, except that 25 g of virgin aggregate having a particle size of 0.09 mm, 75 g of virgin aggregate having a particle size of 3 mm, 100 g of virgin aggregate having a particle size of 6 mm, 200 g of virgin aggregate having a particle size of 10 mm, and 200 g of virgin aggregate having a particle size of 13 mm were used instead of the virgin aggregate comprising a 5:5 mixture (w/w) of gravel having a particle size of about 3 mm and gravel having a particle size of about 5 mm.

EXAMPLE 3

An asphalt concrete composition having improved waterproof performance was prepared in the same manner as described in Example 1, except that 8 g of perfluoromethoxysilane was further added.

EXAMPLE 4

An asphalt concrete composition having improved waterproof performance was prepared in the same manner as described in Example 1, except that 5 g of zinc stearate was further added.

EXAMPLE 5

An asphalt concrete composition having improved waterproof performance was prepared in the same manner as described in Example 1, except that 8 g of polybutene was further added.

EXAMPLE 6

An asphalt concrete composition having improved waterproof performance was prepared in the same manner as described in Example 1, except that 12 g of poly-isobutylene was further added.

EXAMPLE 7

An asphalt concrete composition having improved waterproof performance was prepared in the same manner as described in Example 1, except that 7 g of lithium silicate was further added.

EXAMPLE 8

An asphalt concrete composition having improved waterproof performance was prepared in the same manner as described in Example 1, except that 7 g of sodium alginate was further added.

EXAMPLE 9

An asphalt concrete composition having improved waterproof performance was prepared in the same manner as described in Example 1, except that 5 g of acrylonitrile was further added.

EXAMPLE 10

An asphalt concrete composition having improved waterproof performance was prepared in the same manner as described in Example 1, except that 10 g of dimethyl ammonium chloride was further added.

EXAMPLE 11

An asphalt concrete composition having improved waterproof performance was prepared in the same manner as described in Example 1, except that 3 g of butyl glycidyl ether was further added.

EXAMPLE 12

An asphalt concrete composition having improved waterproof performance was prepared in the same manner as described in Example 1, except that 3 g of orthoboric acid was further added.

EXAMPLE 13

An asphalt concrete composition having improved waterproof performance was prepared in the same manner as described in Example 1, except that 3 g of zinc oxide was further added.

EXAMPLE 14

An asphalt concrete composition having improved waterproof performance was prepared in the same manner as described in Example 1, except that 3 g of trimethylolpropane triacrylate was further added.

EXAMPLE 15

An asphalt concrete composition having improved waterproof performance was prepared in the same manner as described in Example 1, except that 3 g of hydrazine phenyl triazine was further added.

EXAMPLE 16

An asphalt concrete composition having improved waterproof performance was prepared in the same manner as described in Example 1, except that 1 g of starch phosphate ester was further added.

EXAMPLE 17

An asphalt concrete composition having improved waterproof performance was prepared in the same manner as described in Example 1, except that 0.5 g of sodium benzoate was further added.

EXAMPLE 18

An asphalt concrete composition having improved waterproof performance was prepared in the same manner as described in Example 1, except that 3 g of calcium phosphate was further added.

EXAMPLE 19

An asphalt concrete composition having improved waterproof performance was prepared in the same manner as described in Example 1, except that 3 g of carboxymethylcellulose was further added.

EXAMPLE 20

An asphalt concrete composition having improved waterproof performance was prepared in the same manner as described in Example 1, except that 5 g of tetraethylenepentamine was further added.

EXAMPLE 21

An asphalt concrete composition having improved waterproof performance was prepared in the same manner as described in Example 1, except that 3 g of octylphenol ethoxylate was further added.

EXAMPLE 22

An asphalt concrete composition having improved waterproof performance was prepared in the same manner as described in Example 1, except that 5 g of ammonium nonylphenol ether sulfate was further added.

EXAMPLE 23

An asphalt concrete composition having improved waterproof performance was prepared in the same manner as described in Example 1, except that 3 g of sodium bicarbonate was further added.

EXAMPLE 24

An asphalt concrete composition having improved waterproof performance was prepared in the same manner as described in Example 1, except that 3 g of polyvinylidene fluoride resin was further added.

EXAMPLE 25

An asphalt concrete composition having improved waterproof performance was prepared in the same manner as described in Example 1, except that 7 g of aminomethyl polydimethylsiloxane was further added.

EXAMPLE 26

An asphalt concrete composition having improved waterproof performance was prepared in the same manner as described in Example 1, except that 2 g of zinc sulphate was further added.

EXAMPLE 27

An asphalt concrete composition having improved waterproof performance was prepared in the same manner as described in Example 1, except that 2 g of polyindolocarbazole was further added.

EXAMPLE 28

An asphalt concrete composition having improved waterproof performance was prepared in the same manner as described in Example 1, except that 10 g of microscopic hollow spherical powder having a particle size of about 50 μm was further added.

EXAMPLE 29

An asphalt concrete composition having improved waterproof performance was prepared in the same manner as described in Example 1, except that 2 g of calcined pozzolana obtained by calcining a mixture of 100 g of natural pozzolana and 10 g of calcium at 1100° C. for 0.5 hours and grinding the calcined mixture to an average particle size of 15 μm was further added.

EXAMPLE 30

An asphalt concrete composition having improved waterproof performance was prepared in the same manner as described in Example 1, except that 4 g of polymethylsilsesquioxane was further added.

EXAMPLE 31

An asphalt concrete composition having improved waterproof performance was prepared in the same manner as described in Example 1, except that 5 g of tetraethylorthosilicate was further added.

EXAMPLE 32

An asphalt concrete composition having improved waterproof performance was prepared in the same manner as described in Example 1, except that 7 g of polyvinyl pyrrolidone was further added.

EXAMPLE 33

An asphalt concrete composition having improved waterproof performance was prepared in the same manner as described in Example 1, except that 3 g of dioctyl terephthalate was further added.

EXAMPLE 34

An asphalt concrete composition having improved waterproof performance was prepared in the same manner as described in Example 1, except that 2 g of sodium rosinate was further added.

EXAMPLE 35

An asphalt concrete composition having improved waterproof performance was prepared in the same manner as described in Example 1, except that 6 g of a 1:1 mixture (w/w) of nickel powder and chromium powder was further added.

EXAMPLE 36

An asphalt concrete composition having improved waterproof performance was prepared in the same manner as described in Example 1, except that the additives used in Example 3 to Example 35 were added to Example 1.

Test

An asphalt concrete layer having a thickness of about 60 mm was prepared using each of the compositions prepared in the Examples, and then the waterproof performance, curability at low temperature (at −10° C.), cracking, dynamic stability, indirect tensile strength, strength against deformation, compression strength and the like thereof were measured. The results of the measurement are shown in Table 1 below.

Here, the dynamic stability was measured by a deformation strength test according to the Kim Test in order to evaluate the rutting resistance, and the indirect tensile strength was measured in order to evaluate the cracking resistance. In addition, the compression strength was measured using an asphalt compressive strength tester.

TABLE 1

| | Waterproof performance | Gelling/hr (at −10° C.) | Cracking | Dynamic stability (pass/mm) | Indirect tensile strength (ITS) | Deformation strength (MPa) | Compression strength (MPa) | |
|---|---|---|---|---|---|---|---|---|
| | | | | | | | After 7 days | After 28 days |
| Example 1 | 98% | 65 | Absent | 1865 | 0.89 | 5.82 | 32.3 | 86 |
| Example 2 | 99% | 66 | Absent | 1863 | 0.87 | 5.81 | 32.1 | 87 |
| Example 3 | 98% | 65 | Absent | 1864 | 0.89 | 5.82 | 32.3 | 87 |
| Example 4 | 99% | 67 | Absent | 1855 | 0.88 | 5.79 | 31.1 | 86 |
| Example 5 | 99% | 67 | Absent | 1882 | 0.85 | 5.85 | 31.2 | 82 |
| Example 6 | 99% | 68 | Absent | 1883 | 0.88 | 5.79 | 31.1 | 87 |
| Example 7 | 99% | 67 | Absent | 1847 | 0.88 | 5.72 | 34.4 | 81 |
| Example 8 | 99% | 65 | Absent | 1864 | 0.88 | 5.64 | 31.3 | 82 |
| Example 9 | 98% | 64 | Absent | 1875 | 0.87 | 5.71 | 33.2 | 83 |
| Example 10 | 98% | 65 | Absent | 1888 | 0.87 | 5.94 | 31.7 | 85 |
| Example 11 | 98% | 69 | Absent | 1868 | 0.85 | 5.77 | 32.2 | 81 |
| Example 12 | 98% | 63 | Absent | 1865 | 0.84 | 5.80 | 32.7 | 83 |
| Example 13 | 99% | 67 | Absent | 1855 | 0.87 | 5.82 | 31.5 | 84 |
| Example 14 | 99% | 67 | Absent | 1840 | 0.86 | 5.81 | 32.2 | 86 |
| Example 15 | 99% | 65 | Absent | 1841 | 0.87 | 5.80 | 32.4 | 85 |
| Example 16 | 99% | 68 | Absent | 1866 | 0.89 | 5.78 | 31.1 | 86 |
| Example 17 | 99% | 67 | Absent | 1886 | 0.89 | 5.78 | 31.3 | 82 |
| Example 18 | 98% | 68 | Absent | 1868 | 0.89 | 5.82 | 33.5 | 84 |
| Example 19 | 99% | 65 | Absent | 1849 | 0.88 | 5.78 | 32.4 | 86 |
| Example 20 | 99% | 68 | Absent | 1849 | 0.88 | 5.69 | 31.1 | 88 |
| Example 21 | 99% | 67 | Absent | 1849 | 0.88 | 5.80 | 31.2 | 88 |
| Example 22 | 99% | 67 | Absent | 1848 | 0.89 | 5.78 | 33.7 | 88 |
| Example 23 | 98% | 67 | Absent | 1858 | 0.88 | 5.79 | 33.4 | 86 |
| Example 24 | 99% | 67 | Absent | 1885 | 0.87 | 5.82 | 31.3 | 86 |
| Example 25 | 98% | 67 | Absent | 1868 | 0.88 | 5.80 | 33.5 | 85 |
| Example 26 | 98% | 69 | Absent | 1857 | 0.87 | 5.78 | 32.4 | 86 |
| Example 27 | 99% | 68 | Absent | 1887 | 0.87 | 5.69 | 32.5 | 87 |
| Example 28 | 98% | 69 | Absent | 1877 | 0.89 | 5.83 | 33.2 | 87 |
| Example 29 | 99% | 67 | Absent | 1876 | 0.87 | 5.84 | 32.4 | 88 |
| Example 30 | 98% | 67 | Absent | 1877 | 0.89 | 5.79 | 32.4 | 87 |
| Example 31 | 99% | 67 | Absent | 1886 | 0.87 | 5.82 | 32.5 | 87 |
| Example 32 | 99% | 68 | Absent | 1885 | 0.88 | 5.80 | 33.5 | 87 |
| Example 33 | 98% | 68 | Absent | 1884 | 0.88 | 5.77 | 32.4 | 86 |
| Example 34 | 99% | 67 | Absent | 1883 | 0.87 | 5.78 | 32.6 | 87 |
| Example 35 | 98% | 68 | Absent | 1886 | 0.88 | 5.82 | 32.3 | 88 |
| Example 36 | 98% | 68 | Absent | 1884 | 0.89 | 5.81 | 32.4 | 88 |

As can be seen in Table 1 above, the asphalt concrete compositions of Examples 1 to 36, which have improved waterproof performance by comprising SIS, recycled asphalt aggregate, and fine powder aggregate with improved particle size, showed good waterproof performance, indirect tensile strength and deformation strength. Furthermore, these asphalt concrete compositions were gelled at low temperature, indicating that they were cured rapidly. In addition, these asphalt concrete compositions had no cracks, and had a compression strength of 75 MPa or higher after 28 days, suggesting that all the asphalt concrete compositions of the Examples have high strengths.

As described above, the asphalt concrete composition according to the present invention has improved waterproof performance by comprising SIS, recycled asphalt aggregate, and fine powder aggregate with improved particle size. It has excellent waterproof performance due to its high cohesion and adhesion, has good durability, and is not easily rutted, aged and/or stripped. In addition, it has a performance grade of PG 82-34, can prevent water penetration and potholes, and enables a placement process to be easily performed at low costs.

What is claimed is:

1. An asphalt concrete composition comprising:
   100 parts by weight of virgin asphalt;
   5 to 25 parts by weight of styrene isoprene styrene;
   5 to 15 parts by weight of petroleum resin;
   250 to 1,000 parts by weight of recycled asphalt aggregate;
   1 to 10 parts by of a performance improving agent;
   250 to 1,000 parts by weight of virgin aggregate;
   30 to 150 parts by weight of fine powder aggregate having a particle size of 0.001 to 0.0799 mm; and
   0.1 to 2 parts by weight of cellulose fiber.

2. The asphalt concrete composition of claim 1, wherein the virgin aggregate comprises, based on 100 parts by weight of the virgin asphalt, 2.5 to 100 parts by weight of virgin aggregate having a particle size of 0.08 to 2.49 mm, 2.5 to 100 parts by weight of virgin aggregate having a particle size of 2.5 to 5.99 mm, 22.5 to 200 parts by weight of virgin aggregate having a particle size of 6 to 9.99 mm, 100 to 300 parts by weight of virgin aggregate having a particle size of 10 to 12.99 mm, and 100 to 300 parts by weight of virgin aggregate having a particle size of 13 mm.

3. The asphalt concrete composition of claim 1, wherein the cellulose fiber is natural cellulose fiber.

4. A method for constructing asphalt concrete pavement, comprising:
   cleaning a target surface to be paved;
   providing an asphalt concrete composition of claim 1;
   transporting the provided asphalt concrete composition by a transporting means and placing the transported asphalt concrete composition on the cleaned target surface;
   compacting the placed asphalt concrete composition; and
   curing the compacted asphalt concrete composition.

5. The asphalt concrete composition of claim 1, wherein the performance improving agent comprises 90 to 99.5 wt % of vinyl acetate monomer-paraffin oil and 0.5 to 10 parts by weight of benzoyl peroxide.

6. The asphalt concrete composition of claim 5, wherein the vinyl acetate monomer-paraffin oil is a mixture of 5 to 25 weight % of a vinyl acetate monomer and 75 to 95 weight % of paraffin oil.

7. The asphalt concrete composition of claim 6, wherein the virgin aggregate is a mineral material consolidatable into a lump by at least one of an asphalt, a petroleum resin and a binder.

8. The asphalt concrete composition of claim 7, wherein the binder is a styrene isoprene styrene and is chemically stable that does not react with the atmosphere at room temperature in a manner observable to the naked eye.

9. The asphalt concrete composition of claim 1, wherein the virgin aggregate is one of the following: sand, gravel, basalt or obsidian.

10. The asphalt concrete composition of claim 1, wherein the petroleum resin has a melting temperature of 100° C. or higher, a penetration index of 3 dmm or less, and a viscosity at 140° C. of 50 to 500 cps.

11. The asphalt concrete composition of claim 10, wherein the petroleum resin is an aliphatic C5 petroleum resin having a melting temperature of 110° C. to 140° C., a penetration index of 0.5 to 2 dmm and a viscosity at 140° C. of 50 to 300 cps.

12. The asphalt concrete composition of claim 1, wherein the virgin asphalt is a petroleum-based asphalt or an asphalt mixture.

13. The asphalt concrete composition of claim 12, wherein the asphalt mixture is a mixture of straight asphalt and at least one selected from Trinidad lake asphalt, Trinidad epure asphalt and a mixture thereof.

14. The asphalt concrete composition of claim 13, wherein the asphalt mixture is the mixture of straight asphalt having a penetration index of 20 to 40 and at least one of the Trinidad lake asphalt and the Trinidad epure asphalt.

15. The asphalt concrete composition of claim 13, wherein the asphalt mixture is a mixture of 70 to 80 weight % of the straight asphalt having the penetration index of 20 to 40 and 20 to 30 weight % of the Trinidad lake asphalt or Trinidad epure asphalt.

16. The asphalt concrete composition of claim 1, wherein the fine powder aggregate having a particle size of 0.001 to 0.0799 mm is one of the following: fine stone powder, fine limestone powder, fine sand powder, fine gravel powder, fine basalt powder or fine obsidian powder.

* * * * *